(12) United States Patent
Byeon et al.

(10) Patent No.: US 11,833,527 B2
(45) Date of Patent: Dec. 5, 2023

(54) APPARATUS FOR CAPTURING BIOAEROSOLS

(71) Applicants: Research Cooperation Foundation of Yeungnam University, Gyeongsan-si (KR); INDUSTRY-ACADEMIC COOPERATION FOUNDATION, YONSEI UNIVERSITY, Seoul (KR)

(72) Inventors: Jeong Hoon Byeon, Gyeongsan-si (KR); Jung Ho Hwang, Seoul (KR); Hyeong Rae Kim, Seoul (KR); Sang Gwon An, Uijeongbu-si (KR)

(73) Assignees: Research Cooperation Foundation of Yeungnam University, Gyeongsan-si (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 217 days.

(21) Appl. No.: 17/186,260

(22) Filed: Feb. 26, 2021

(65) Prior Publication Data

US 2022/0161272 A1 May 26, 2022

(30) Foreign Application Priority Data

Nov. 26, 2020 (KR) .......................... 10-2020-0161015

(51) Int. Cl.
*B03C 3/013* (2006.01)
*B03C 3/16* (2006.01)
(Continued)

(52) U.S. Cl.
CPC ............ *B03C 3/013* (2013.01); *B01D 47/027* (2013.01); *B03C 3/16* (2013.01); *B03C 3/38* (2013.01); *B03C 3/53* (2013.01)

(58) Field of Classification Search
CPC .. B03C 3/013; B03C 3/16; B03C 3/17; B03C 3/38; B03C 3/41; B03C 3/53; B03C 1/26;
(Continued)

(56) References Cited

U.S. PATENT DOCUMENTS 6,607,579 B2 * 8/2003 Willey ..................... B03C 3/16
  95/71
7,428,848 B2   9/2008 Pant et al.
(Continued)

FOREIGN PATENT DOCUMENTS

KR       10-1243631 B1     3/2013
KR       20160145416 A  * 12/2016  ............. B03C 3/017
KR       102164528 B1  * 10/2020  ......... G01N 21/6486

*Primary Examiner* — Christopher P Jones
*Assistant Examiner* — Sonji Turner
(74) *Attorney, Agent, or Firm* — Sughrue Mion, PLLC

(57) ABSTRACT

Disclosed is an apparatus for capturing bioaerosols. More particularly, the apparatus for capturing bioaerosols includes a sprayer configured to spray a buffer solution for protecting aerosol particles in a form of droplets; and a capturer into which air including the droplets and the aerosol particles is introduced and in a capture solution in which the aerosol particles are captured, wherein discharge members provided with a plurality of nanostructures are provided on a surface of the capturer to charge the aerosol particles. Due to such a configuration, high discharge efficiency can be anticipated even at a low voltage without damage to aerosol particles.

15 Claims, 5 Drawing Sheets

(51) Int. Cl.
*B03C 3/38* (2006.01)
*B03C 3/53* (2006.01)
*B01D 47/02* (2006.01)

(58) Field of Classification Search
CPC ......... B03C 1/35; B03C 1/30; B03C 2201/10; B01D 47/027; G01N 1/24; G01N 1/40; G01N 2001/242; G01N 2001/4038
See application file for complete search history.

(56) References Cited

U.S. PATENT DOCUMENTS

| | | | |
|---|---|---|---|
| 7,717,980 B2* | 5/2010 | Tepper | B03C 3/16 95/71 |
| 9,114,404 B2* | 8/2015 | Alam | B03C 3/60 |
| 10,509,029 B2* | 12/2019 | Tamura | G01N 21/64 |

* cited by examiner

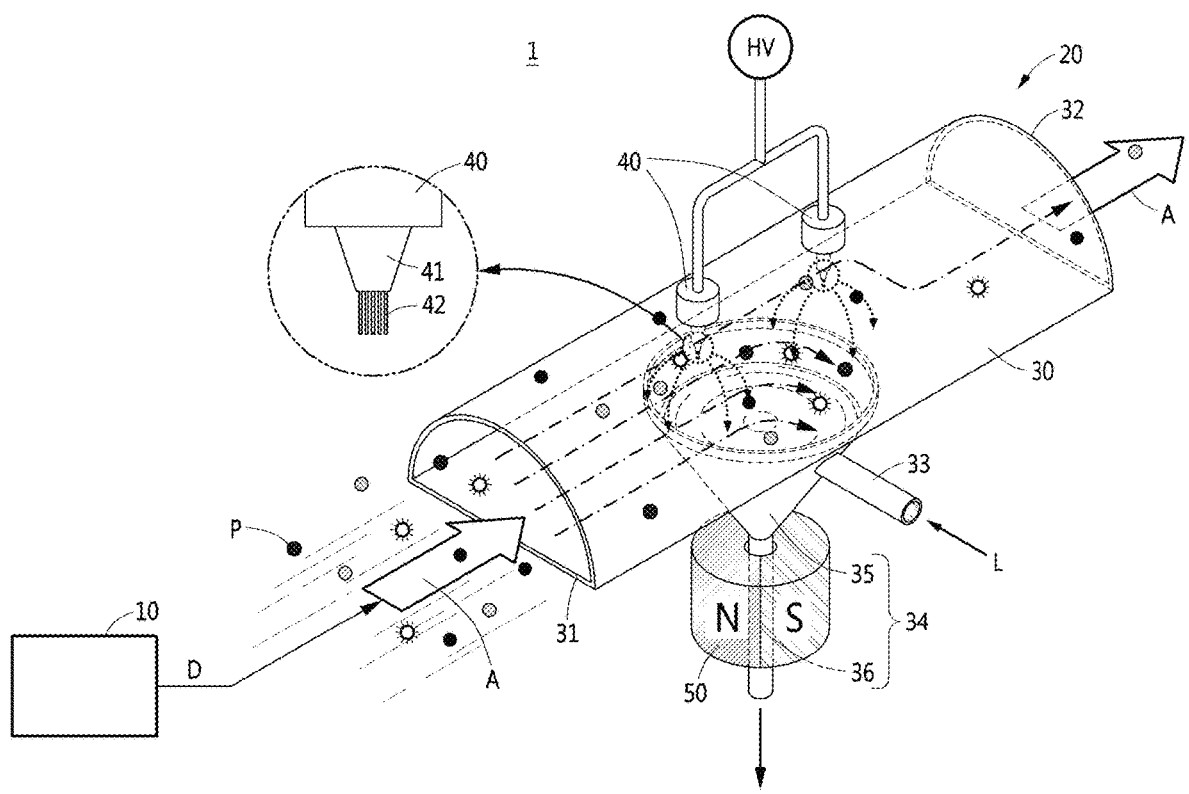
[FIG. 1]

[FIG. 2]
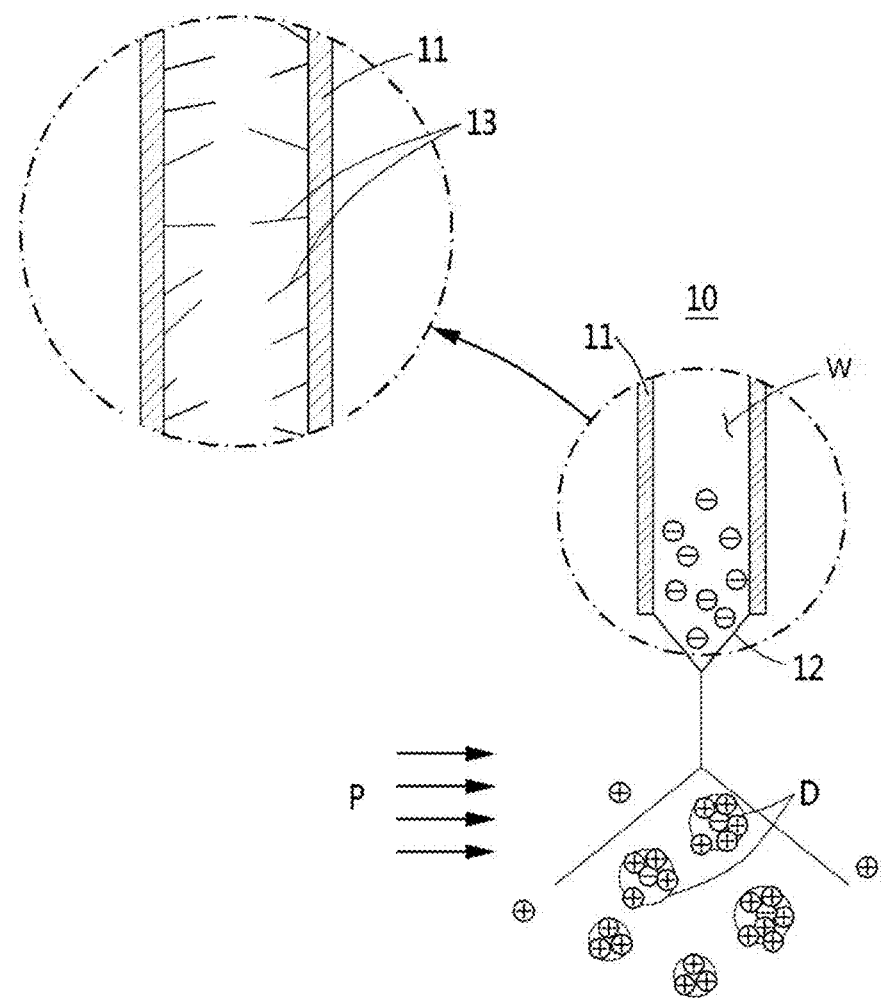

[FIG. 3]
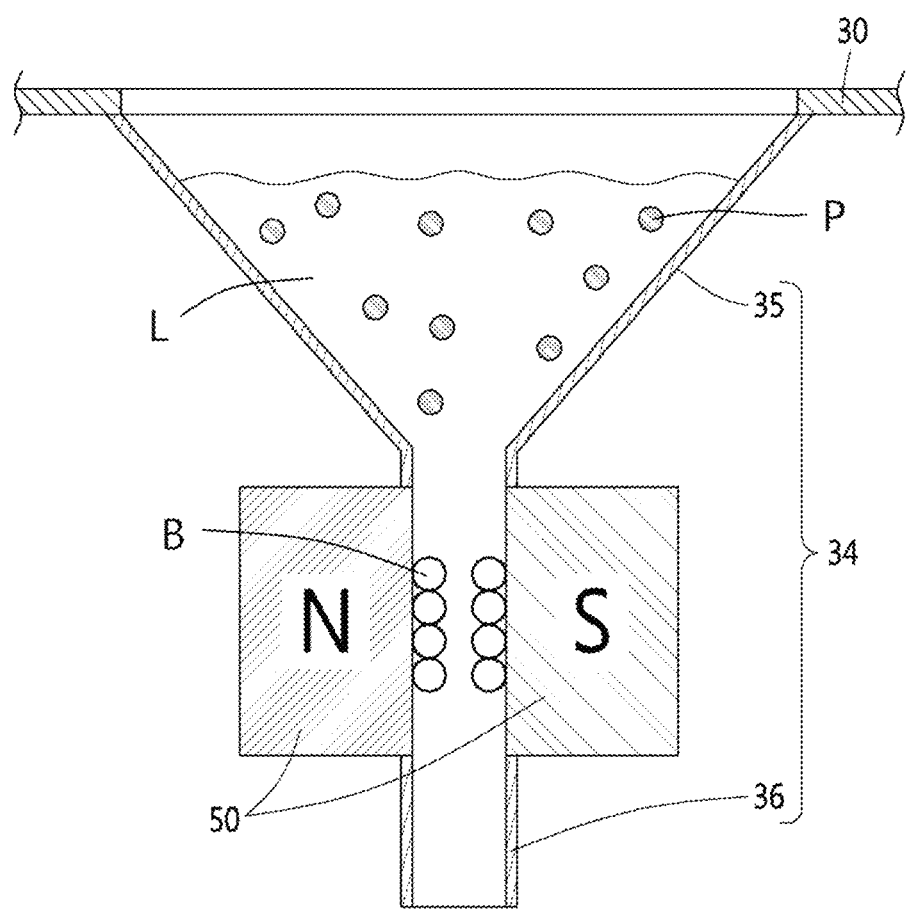

[FIG. 4]
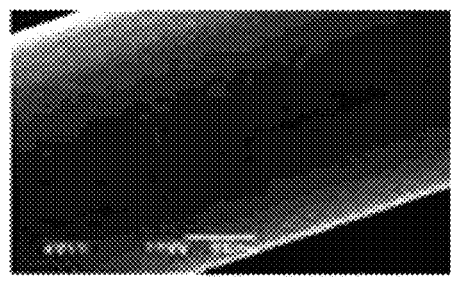 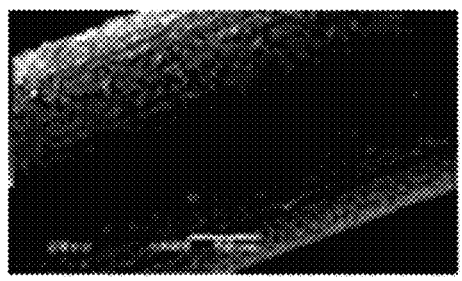
(a)                            (b)

[FIG. 5]
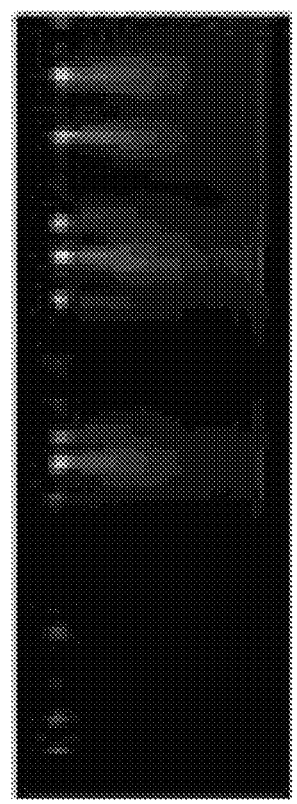 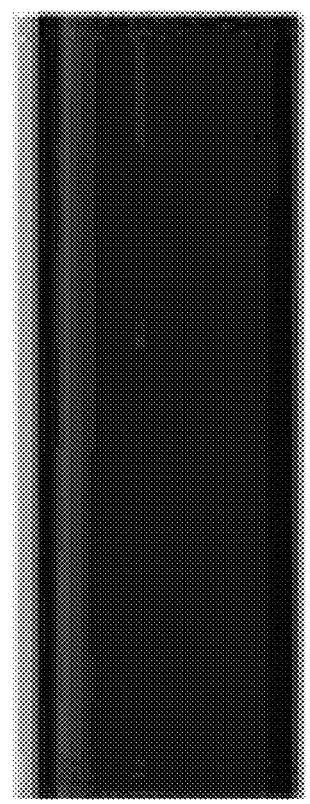
(a) (b)

APPARATUS FOR CAPTURING BIOAEROSOLS

CROSS-REFERENCE TO RELATED APPLICATION

This application claims priority to Korean Patent Application No. 10-2020-0161015, filed on Nov. 26, 2020 in the Korean Intellectual Property Office, the disclosure of which is incorporated herein by reference.

BACKGROUND OF THE DISCLOSURE

Field of the Disclosure

The present disclosure relates to a nanotechnology-based bioaerosol-capturing apparatus capable of, at a high concentration, concentrating and capturing aerosol particles containing infectious viruses in the air.

Description of the Related Art

Recently, various sensors for monitoring bioaerosols that cause infection or disease in the human body have been developed. Sensors for monitoring bioaerosols generally capture bioaerosols using a collection solution, so that a sampling technique that analyzes the risk of viruses in the air is applied thereto. This virus sampling technique has the disadvantage of requiring a long sampling time, which is a limitation of mechanical methods.

To compensate for the limitations of these mechanical methods, technology for capturing bioaerosol particles using an electrostatic precipitation method has been applied in recent years. However, capture of bioaerosols using an electrostatic precipitation causes damage to bioparticles due to a high electric field, thereby decreasing an identification analysis rate.

Accordingly, various research on technologies for simultaneously realizing high-speed sampling and preservation concentration by capturing and concentrating minute particles such as viruses in the air is required.

RELATED ART DOCUMENTS

Patent Documents

Korean Patent No. 10-1243631
U.S. Pat. No. 7,428,848

SUMMARY OF THE DISCLOSURE

Therefore, the present disclosure has been made in view of the above problems, and it is an object of the present disclosure to provide an apparatus for capturing bioaerosols which is capable of capturing aerosol particles, which contain viruses in the air, at a high concentration without damage to improve analysis efficiency.

In accordance with an aspect of the present disclosure, the above and other objects can be accomplished by the provision of an apparatus for capturing bioaerosols, including: a sprayer configured to spray a buffer solution for protecting aerosol particles in a form of droplets; and a capturer into which air including the droplets and the aerosol particles is introduced and in a capture solution in which the aerosol particles are captured, wherein discharge members provided with a plurality of nanostructures are provided on a surface of the capturer to charge the aerosol particles.

In addition, the sprayer may include a nozzle configured to charge the buffer solution with a negative voltage so that the charged buffer solution is discharged; and a tailor cone provided at an outlet of the nozzle to spray the charged liquid in the form of the droplets by repulsive force, wherein a plurality of nano-members to which a negative electrode is applied are provided on an inner surface of the nozzle.

In addition, the capturer may include a capture tube where the droplets and air are introduced and discharged; the discharge members configured to apply discharge electrodes toward an inside of the capture tube so that the aerosol particles are charged and thus captured in the capture solution; and a concentration member configured to concentrate the aerosol particles captured in the capture solution, wherein the nanostructures are provided on a surface of each of the discharge members.

In addition, each of the discharge members may include at least one of a tip with discharge pins facing an inside of the capture tube; and a discharge wire having a wire shape, and the discharge members may serve to charge the aerosol particles introduced into the capture tube by electrospraying.

In addition, the nanostructures may include a plurality of nanopins formed by at least one of a carbon nanotube (CNT) growth method; and an etching method of etching a metal containing carbon or tungsten.

In addition, the nanostructures may have an aspect ratio exceeding 1.

In addition, the capture tube may be provided with an inlet passage and outlet passage that extend in a longitudinal direction such that an inlet and outlet, where the droplets and air are introduced and discharged, face each other and are formed between the inlet and the outlet such that the capture solution are introduced thereinto and discharged therefrom, wherein the outlet passage is provided with the concentration member.

In addition, the outlet passage may have a funnel shape, and the concentration member may include a magnet detachably installed on an outer surface of the outlet passage, and thus, may interfere with bead particles, coated on an inner surface of the outlet passage and bonded to the aerosol particles, by magnetic force.

In addition, the discharge members may be provided in a direction crossing or facing a flow direction of the air introduced into the capturer.

In addition, the discharge members may be formed of an electrode material including a bundle of conductive microfibers.

In accordance with another aspect of the present disclosure, there is provided an apparatus for capturing bioaerosols, including: a capture tube where air including aerosol particles are introduced and discharged and in which a capture solution circulates; and discharge members configured to apply discharge electrodes toward an inside of the capture tube so as to charge the aerosol particles and thus allow the charged aerosol particles to be captured in the capture solution, wherein a plurality of nanopins are provided to protrude from a surface of the discharge members so as to charge the aerosol particles.

In addition, the capture tube may extend in a longitudinal direction such that an inlet and outlet where the droplets and air are introduced and discharged face each other, wherein the inlet of the capture tube is connected to a sprayer that charges a buffer solution for protecting the aerosol particles with a negative voltage and sprays the charged buffer solution in a form of droplets.

In addition, the sprayer may include a nozzle configured to charge the buffer solution with a negative voltage so that the charged buffer solution is discharged; and a tailor cone provided at an outlet of the nozzle to spray the charged liquid in the form of the droplets by repulsive force, wherein a plurality of nano-members to which a negative electrode is applied are provided on an inner surface of the nozzle.

In addition, the capture tube may be provided with an inlet passage and outlet passage that extend in a longitudinal direction such that an inlet and outlet, where the droplets and air are introduced and discharged, face each other and are formed between the inlet and the outlet such that the capture solution are introduced thereinto and discharged therefrom, wherein the outlet passage is provides with a concentration member for concentrating the aerosol particles captured in the capture solution.

In addition, the outlet passage may have a funnel shape, and the concentration member includes a magnet detachably installed on an outer surface of the outlet passage, and thus, may interfere with bead particles, coated on an inner surface of the outlet passage and bonded to the aerosol particles, by magnetic force.

In addition, each of the discharge members may include at least one of a tip with discharge pins facing an inside of the capture tube; and a discharge wire having a wire shape, and the discharge members serve to charge the aerosol particles introduced into the capture tube by electrospraying.

In addition, the nanopins may include a plurality of nanopins formed by at least one of a carbon nanotube (CNT) growth method; and an etching method of etching a metal containing carbon or tungsten.

In addition, the nanopins may have an aspect ratio exceeding 1.

In addition, the discharge members may apply discharge electrodes in a direction crossing or facing a flow direction of the air introduced into the capture tube.

In addition, the discharge members may be formed of an electrode material including a bundle of conductive microfibers.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram schematically illustrating an apparatus for capturing bioaerosols according to a preferred embodiment of the present disclosure;

FIG. 2 schematically illustrates a sprayer shown in FIG. 1;

FIG. 3 schematically illustrates a concentration member shown in FIG. 1;

FIG. 4 is a set of images for comparing a discharge member provided with conventional discharge pins and a discharge member provided with nanopins according to the present disclosure; and FIG. 5 is a set of images for schematically comparing discharge in a discharge member provided with conventional discharge pins and a discharge member provided with nanopins according to the present disclosure.

DETAILED DESCRIPTION OF THE DISCLOSURE

Hereinafter, a preferred embodiment of the present disclosure is described with reference to the accompanying drawings.

Referring to FIGS. 1 and 2, an apparatus 1 for capturing bioaerosols according to a preferred embodiment of the present disclosure includes a sprayer 10 and a capturer 20.

For reference, the apparatus 1 for capturing bioaerosols described in the present disclosure captures and concentrates pathogen virus particles such as coronavirus floating in the air. However, the present disclosure is not limited to the function, and it is natural that the function of the apparatus 1 for capturing bioaerosols according to the present disclosure may be modified in various ways such as capture of minute dust in the air to sense the concentration of the minute dust.

The sprayer 10 sprays a liquid, which contains a buffer solution W for protecting aerosol particles P, in the form of droplets D. For this, the sprayer 10 includes a nozzle 11 and a tailor cone 12, as shown in FIG. 2.

The nozzle 11 charges the buffer solution W with a negative voltage and discharges the same. As shown in FIG. 2, a plurality of nano-members 13 protrude along an inner surface of the nozzle 11. Here, the nano-members 13 may be provided by at least one of a carbon nanotube (CNT) growth method; and an etching method of etching a metal containing carbon or tungsten. Meanwhile, the buffer solution W in the liquid passing though the nozzle 11 may be negatively charged even at a low voltage due to interference with the nano-members 13, as shown in FIG. 2. That is, the nano-members 13 is a kind of hierarchy electrode for charging the buffer solution W passing through the nozzle 11.

The tailor cone 12 is provided at an outlet of the nozzle 11 and is configured to spray the buffer solution W in the form of the droplets D by repulsive force. The tailor cone 12 is a kind of nozzle for electrospraying the buffer solution W, which has passed through the nozzle 11 and been negatively charged, to the capturer 20. This capturer 20 is described below. The tailor cone 12 is opened when a repulsive force, which is an electrostatic force overcoming the surface tension, is applied, to electrostatically spray the buffer solution W in the form of the droplets D.

Meanwhile, the droplets D sprayed from the sprayer 10 are in a negatively charged state, thus having good adhesion to the aerosol particles P. Accordingly, the aerosol particles P are protected from being damaged, due to binding with the droplets D, when the aerosol particles P are discharged inside the capturer 20, so that capture of the aerosol particles P by a capture solution L may be improved.

Air A including the droplets D and aerosol particles P introduced through the sprayer 10 is introduced into the capturer 20, and the aerosol particles P therein are captured by a capture solution L. The capturer 20 includes a capture tube 30, discharge members 40 and a concentration member 50, as shown in FIG. 1.

The capture tube 30 is a pipe through which the droplets D and the air A are introduced and discharged. The capture tube 30 has a hollow tube shape wherein an inlet 31 and outlet 32, through which the droplets D and air A sprayed from the sprayer 10 are introduced and discharged, are disposed to face each other.

In addition, the capture tube 30 is provided with an inlet passage 33, through which the capture solution L is introduced, and an outlet passage 34, through which the capture solution L is discharged. Here, the inlet passage 33 and the outlet passage 34 are arranged between the inlet 31 and the outlet 32. The outlet passage 34 has a funnel-like shape. More particularly, the outlet passage 34 includes a cup-shaped upper part 35 whose diameter gradually decreases in a discharge direction; and a tube-shaped lower part 36 having a relatively narrow diameter compared to the diameter of the upper part 35.

The discharge members 40 apply discharge electrodes for charging the aerosol particles P toward the inside of the capture tube 30. The discharge members 40 have a discharge pin shape with a tip 41 that faces the inside of the capture tube 30, as enlarged in FIG. 1. However, the present disclosure is not limited as to the shape, and it is natural that the discharge members 40 may be transformed into the form of a discharge wire having a wire shape.

The discharge members 40 are discharge electrodes that are made of a metal material and are provided in a pair including a positive electrode and a negative electrode. In addition, a nanostructure including nanopins 42 is provided on a surface of the tip 41 of each of the discharge members 40. The plural nanopins 42 are formed by at least one of a carbon nanotube (CNT) growth method; and an etching method of etching a metal containing carbon or tungsten.

For reference, the discharge member 40 provided with the nanopins 42 is made of an electrode material such as a metal material. In an embodiment of the present disclosure, the discharge member 40 is exemplified as including a bundle of conductive microfibers.

Due to the nanopins 42, high-efficiency discharge effects can be implemented when a low voltage is applied to the discharge members 40. Accordingly, the aerosol particles P containing viruses to be discharged by the discharge members 40 may be prevented from being damaged by high-voltage discharge, thereby providing a high concentration ratio.

Meanwhile, it is preferred that an aspect ratio, which is a ratio of the width to the height of the nanopins 42 described in the present disclosure, is greater than 1:1, or 5:1 or more, the diameter of each of the nanopins 42 is less than 500 nm, and the nanopins 42 are arranged at intervals larger than $10^2$ pins/nm$^2$ on a surface of the discharge members 40 as a metal support. When the aspect ratio of the nanopins 42 is 5:1 or more, the discharge efficiency of the aerosol particles P may be maximized even when a low voltage is applied.

For reference, it is natural that the aspect ratio of the nanopins 42 is not limited to a ratio of 5:1, and may be set to various ratios, preferably, exceeding 1.

The aerosol particles P discharged by the discharge members 40 are captured in the capture solution L introduced into the capture tube 30. For this, the discharge members 40 are arranged between the inlet 31 of the capture tube 30 and the outlet 32 thereof to face the capture solution L. Here, the capture solution L is a kind of ground electrode connected to a ground electrode.

Due to such a configuration, electrons are accelerated in the corona range near the discharge members 40 to collide with molecules in the air A when a voltage is applied to the discharge members 40. Accordingly, ions generated by separating molecules into ions and electrons adhere the aerosol particles P in the air A passing between the discharge members 40 and the capture solution L, thereby charging the aerosol particles P. In addition, the discharge members 40 form corona discharge while drawing an approximately hemispherical trajectory toward a surface of the capture solution L around the tip 41. Accordingly, the charged aerosol particles P are captured in the capture solution L, which is a ground electrode, by electrostatic force.

For reference, the discharge members 40 are exemplified as applying the discharge electrodes, in a direction crossing the flow direction of the air A, toward the bottom of the capture tube 30 from the top thereof in the present embodiment, but the present disclosure is not limited thereto. For example, the discharge members 40 may apply the discharge electrodes in a direction of facing the flow direction of the air A, or in a direction of crossing the flow direction of the air A toward the top of the capture tube 30 from the bottom thereof. That is, the discharge electrodes of e discharge members 40 may be generated at various angles and positions to cross or face the flow direction of the air A.

In addition, the discharge members 40 may charge the aerosol particles P in an electrospraying manner as in the sprayer 10 described above. The configuration of charging the aerosol particles P by electrospraying of the discharge members 40 is similar to that of the sprayer 10, and thus, a detailed description and illustration thereof are omitted.

For reference, the capture solution L may circulate inside and outside the capture tube 30 by a pump (not shown). More particularly, the pump (not shown) supplies the capture solution L through the inlet passage 33 of the capture tube 30, and the capture solution L via the capture tube 30 is discharged through the outlet 32 and re-introduced into the pump (not shown). By the pump (not shown), the capture solution L continuously flows without stagnation to circulate inside and outside the capture tube 30.

The concentration member 50 concentrates the aerosol particles P captured in the capture solution L. For this, the concentration member 50 includes a magnet detachably installed on an outer circumferential surface of the lower part 36 of the outlet passage 34 with a funnel shape as shown in FIG. 3, thereby concentrating the aerosol particles P captured in the capture solution L using magnetic force.

More particularly, when magnetic bead particles B are supplied to the capture solution L, the bead particles B are introduced into the outlet passage 34 by gravity. The bead particles B introduced into the outlet passage 34 interfere with the magnetic force of the concentration member 50 installed on the outer circumferential surface, thereby being coated on an inner circumferential surface of the outlet passage 34.

When the aerosol particles P are captured in the capture solution L and introduced into the outlet passage 34, the aerosol particles P bind with the bead particles B. Next, when the concentration member 50 is separated from the outlet passage 34 to release the magnetic force interfering with the bead particles B, the bead particles B bonded to the aerosol particles P are collected. Accordingly, the aerosol particles P are concentrated in the capture solution L and sampled.

A capture operation of the apparatus 1 for capturing bioaerosols according to the present disclosure having the above configuration is described with reference to FIG. 1.

As shown in FIG. 1, external air A is introduced into the capture tube 30 while the droplets D are sprayed from the sprayer 10. Here, the sprayer 10 negatively charges the buffer solution W via the nozzle 11 including the plural nano-members 13 thereinside as shown in FIG. 2 and sprays the charged buffer solution W in the form of the droplets D using the tailor cone 12. By the sprayer 10, the buffer solution W is sprayed in the form of the droplets D to be introduced into the capture tube 30 together with the air A, so that the droplets D adhere and protect the aerosol particles P such as viruses in the air A.

The air A introduced into the capture tube 30 is charged by the discharge members 40. Here, the tip 41 of each of the discharge members 40 is provided with the plural nanopins 42, so that the aerosol particles P included in the air A are charged without damage even when a low voltage is applied.

The charged aerosol particles P are discharged to the outside through the outlet passage 34. Here, the bead particles B interfered by the magnetic force of the concentration member 50 that is provided in the outlet passage 34 bind to the aerosol particles P, thereby being concentrated and captured at a high concentration, as shown in FIG. 3.

For reference, the aerosol particles P concentrated and captured in the above manner are discharged via the outlet passage 34 and are supplied to an external sensor means for concentration measurement.

FIGS. 4 and 5 illustrate photographs of the discharge members 40 with a discharge pin shape described in the present disclosure. In FIG. 4, (a) illustrates a photograph of conventional discharge pins, and (b) illustrates a photograph of the discharge members 40 provided with the plural nanopins 42 according to the present disclosure. In addition, in FIG. 5, (a) illustrates a discharge photograph of conventional discharge pins, and (b) illustrates a discharge photograph of the discharge members 40 provided with the nanopins 42 according to the present disclosure.

As shown in FIGS. 4 and 5, the plural nanopins 42 are provided on a surface of each of the discharge members 40 according to the present disclosure, so that high discharge effect may be realized even at a low voltage, compared to the case of conventional discharge pins different from the nanopins 42.

In accordance with the present disclosure having the above configuration, discharging efficiency of a certain quality or higher can be anticipated, even when a low voltage is applied to discharge members, due to the discharge members whose surfaces are provided with nanostructures.

In addition, aerosol particles can be charged with a low voltage, thereby being capable of preventing damage to aerosol particles due to a high voltage as in conventional cases. Accordingly, analysis quality can be improved due to the capture of aerosol particles concentrated at a high concentration.

Further, a buffer solution sprayed, in the form of droplets, from a sprayer can protect the aerosol particles, which is more advantageous in preventing damage to the aerosol particles.

While the present disclosure has been described referring to the preferred embodiments, those skilled in the art will appreciate that many modifications and changes can be made to the present disclosure without departing from the spirit and essential characteristics of the present disclosure.

DESCRIPTION OF SYMBOLS

1: apparatus for capturing bioaerosols
10: sprayer
20: capturer
30: capture tube
40: discharge member
50: concentration member
A: air
L: capture solution
P: particles
D: droplets
W: buffer solution
B: bead particles

What is claimed is:

1. An apparatus for capturing bioaerosols, comprising:
a sprayer configured to spray a buffer solution for protecting aerosol particles in a form of droplets; and
a capturer into which air comprising the aerosol particles and the droplets are introduced, wherein the aerosol particles are captured into a capture solution,
wherein discharge members provided with a plurality of nanostructures are provided on a surface of the capturer to charge the aerosol particles,
wherein the capturer comprises:
a capture tube where the air and the droplets are introduced and discharged, wherein the discharge members are configured to apply discharge electrodes toward an inside of the capture tube so that the aerosol particles are charged and thus captured in the capture solution; and
a concentration member configured to concentrate the aerosol particles captured in the capture solution, wherein the nanostructures are provided on a surface of each of the discharge members,
wherein each of the discharge members comprises at least one of a tip with discharge pins facing an inside of the capture tube and a discharge wire having a wire shape,
wherein the capture tube extends in a longitudinal direction and is provided with an inlet and an outlet facing each other, the air and the droplets being introduced into the inlet and discharged from the outlet,
wherein the capture tube is further provided with an inlet passage and an outlet passage formed between the inlet and the outlet such that the capture solution is introduced into the inlet passage and discharged from the outlet passage, and the outlet passage is provided with the concentration member, and
wherein the concentration member includes a magnet detachably installed on an outer surface of the outlet passage,
wherein the outlet passage has a funnel shape,
wherein bead particles introduced into the outlet passage interfere with a magnetic force of the magnet and are coated on an inner surface of the outlet passage by the interference with the magnetic force of the magnet, and
wherein the aerosol particles introduced into the outlet passage are bonded to the bead articles in the outlet passage.

2. The apparatus according to claim 1, wherein the sprayer comprises:
a nozzle configured to charge the buffer solution with a negative voltage so that the charged buffer solution is discharged; and
a Taylor cone provided at an outlet of the nozzle to spray charged liquid in the form of the droplets by repulsive force,
wherein a plurality of nano-members to which a negative electrode is applied are provided on an inner surface of the nozzle.

3. The apparatus according to claim 1, wherein the discharge members serve to charge the aerosol particles introduced into the capture tube by electrospraying.

4. The apparatus according to claim 1, wherein the nanostructures comprise a plurality of nanopins formed by at least one of a carbon nanotube (CNT) growth method and an etching method of etching a metal containing carbon or tungsten.

5. The apparatus according to claim 1, wherein the nanostructures have an aspect ratio exceeding 1.

6. The apparatus according to claim 1, wherein the discharge members are provided in a direction crossing or facing a flow direction of the air introduced into the capturer.

7. The apparatus according to claim 1, wherein the discharge members are formed of an electrode material comprising a bundle of conductive microfibers.

8. An apparatus for capturing bioaerosols, comprising:
- a capture tube where air comprising aerosol particles is introduced and discharged and in which a capture solution circulates; and
- discharge members configured to apply discharge electrodes toward an inside of the capture tube to charge the aerosol particles and thus allow the charged aerosol particles to be captured in the capture solution,
- wherein a plurality of nanopins are provided to protrude from a surface of the discharge members to charge the aerosol particles,
- wherein the capture tube extends in a longitudinal direction and is provided with an inlet and an outlet facing each other, the air and droplets being introduced into the inlet and discharged from the outlet, and
- wherein the capture tube is further provided with an inlet passage and an outlet passage formed between the inlet and the outlet such that the capture solution is introduced into the inlet passage and discharged from the outlet passage,
- wherein the outlet passage is provided with a concentration member for concentrating the aerosol particles captured in the capture solution,
- wherein the concentration member includes a magnet detachably installed on an outer surface of the outlet passage,
- wherein each of the discharge members comprises at least one of a tip with discharge pins facing an inside of the capture tube and a discharge wire having a wire shape,
- wherein the outlet passage has a funnel shape,
- wherein bead particles introduced into the outlet passage interfere with a magnetic force of the magnet and are coated on an inner surface of the outlet passage by the interference with the magnetic force of the magnet, and wherein the aerosol particles introduced into the outlet passage are bonded to the bead particles in the outlet passage.

9. The apparatus according to claim 8, wherein the inlet of the capture tube is connected to a sprayer that charges a buffer solution for protecting the aerosol particles with a negative voltage and sprays the charged buffer solution in a form of droplets.

10. The apparatus according to claim 9, wherein the sprayer comprises:
- a nozzle configured to charge the buffer solution with a negative voltage so that the charged buffer solution is discharged; and
- a Taylor cone provided at an outlet of the nozzle to spray charged liquid in the form of the droplets by repulsive force,
- wherein a plurality of nano-members to which a negative electrode is applied are provided on an inner surface of the nozzle.

11. The apparatus according to claim 8, wherein the discharge members serve to charge the aerosol particles introduced into the capture tube by electrospraying.

12. The apparatus according to claim 8, wherein the nanopins comprise a plurality of nanopins formed by at least one of a carbon nanotube (CNT) growth method and an etching method of etching a metal containing carbon or tungsten.

13. The apparatus according to claim 8, wherein the nanopins have an aspect ratio exceeding 1.

14. The apparatus according to claim 8, wherein the discharge members apply discharge electrodes in a direction crossing or facing a flow direction of the air introduced into the capture tube.

15. The apparatus according to claim 8, wherein the discharge members are formed of an electrode material comprising a bundle of conductive microfibers.

* * * * *